United States Patent [19]
Castle

[11] Patent Number: 6,161,720
[45] Date of Patent: Dec. 19, 2000

[54] CONSTANT TEMPERATURE BEVERAGE CUP

[76] Inventor: Benedict P. Castle, 7620 Rivers Ave., Ste 370 PMB 211, North Charleston, S.C. 29406

[21] Appl. No.: 09/513,037

[22] Filed: Feb. 25, 2000

[51] Int. Cl.[7] .................................................. B65D 81/18
[52] U.S. Cl. ............................. 220/592.17; 220/592.26; 220/62.12; 220/62.18; 220/713; 220/501; 220/506
[58] Field of Search ...................... 220/592.17, 592.15, 220/592.26, 592.22, 592.28, 713, 592.16, 62.12, 62.18, 501, 506

[56] References Cited

U.S. PATENT DOCUMENTS

| | | | |
|---|---|---|---|
| 2,899,098 | 8/1959 | Gits | 220/592.17 |
| 4,561,563 | 12/1985 | Woods | 220/592.17 |
| 4,768,354 | 9/1988 | Barnwell | 220/592.17 |
| 5,769,262 | 6/1998 | Yamada et al. | 220/592.17 |
| 5,918,761 | 7/1999 | Wissingell | 220/592.17 |
| 5,975,337 | 11/1999 | Hadley | 220/592.17 |

*Primary Examiner*—Joseph M. Moy

[57] ABSTRACT

The invention is a drinking vessel that keeps coffee or other hot beverages hot, yet readily drinkable. The basic design of the invention is an inner beverage vessel and an outer beverage chamber with an insulator chamber of air between them. There is a small hole in the bottom of the inner beverage vessel which allows the contents to flow into the outer beverage chamber. When the drinker tips the cup to drink, beverage flows from the inner beverage vessel to the outer beverage surrounding the cup and pours out of a mouthpiece. The amount of liquid that fills the outer beverage chamber quickly cools enough to drink, but still remains warm. The insulator chamber keeps the beverage in the inner beverage vessel hot for a longer period of time. The lid for the cup is sealed to keep the contents warm but has a small pinhole to eliminate the build-up of a vacuum.

7 Claims, 7 Drawing Sheets

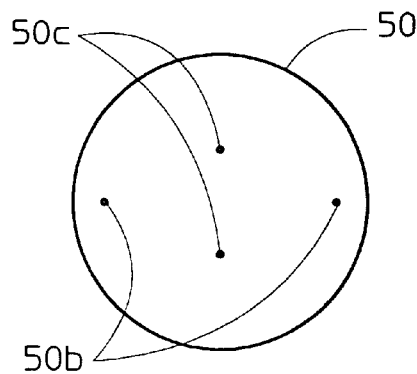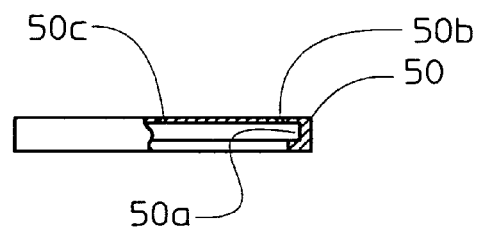
FIG. 6a          FIG. 6b
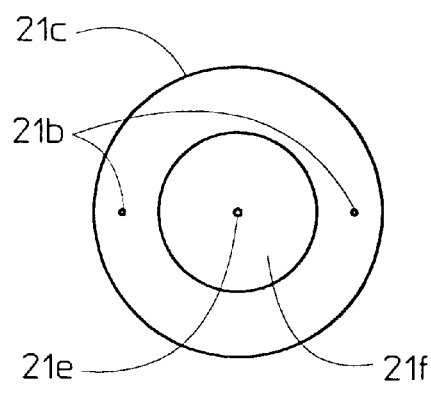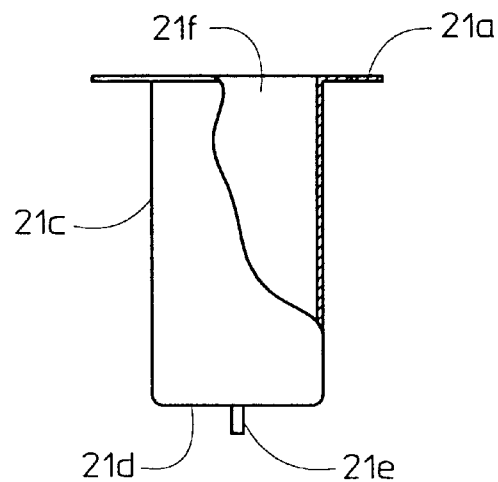
FIG. 7a          FIG. 7b

CONSTANT TEMPERATURE BEVERAGE CUP

RELATED APPLICATIONS

The present invention was first described in Disclosure Document Number 463268 filed on Oct. 7, 1999. There are no previously filed, nor currently any co-pending applications, anywhere in the world.

BACKGROUND OF THE INVENTION

1. Field of the Invention

The present invention relates generally to beverage cups and, more particularly, to a novel hot beverage cup having an inner chamber to maintain the beverage at constant temperature.

2. Description of the Related Art

Coffee, tea and other hot beverages are enjoyed by people almost every day. Many people cannot start their day without a cup of their favorite hot beverage. However, everyone knows that a cup of freshly poured coffee is too hot to drink from and must be blown on so just a sip can be taken. Likewise, a cup of coffee will cool quickly as well and be unsuitable for drinking. This fact is evident by the abundance of coffee warmers on the market that are used to keep a cup of coffee warm while a person is sitting at a desk. All of these facts lead to the conclusion that during the entire life cycle of a cup of coffee, only a small percentage of the time is the temperature optimal for drinking. Most of the time it is either too hot or too cold. Accordingly, a need has arisen for a solution to these problems associated with drinking hot beverages. The development of the constant temperature beverage cup fulfills this need.

In the related art, there exist patents for beverage containers that utilize an insulator barrier such as air as in the present invention. However, there exists no patents which utilize a separate chamber which draws a small amount of beverage into it prior to consumption for cooling the beverage faster than that in the main beverage chamber. Nor are there any devices that attempt to prevent the rapid cooling of a hot beverage and provide a beverage to be served at a more constant temperature.

A search of the prior art did not disclose any patents that read directly on the claims of the instant invention; however, the following references were considered related:

| U.S. Pat. No. | Inventor | Issue Date |
| --- | --- | --- |
| 5,524,817 | Meier et al. | Jun. 11, 1996 |
| 5,515,995 | Allen et al. | May 14, 1996 |
| 4,261,501 | Watkins et al. | Apr. 14, 1981 |
| 2,591,578 | McNealy et al. | Dec. 20, 1947 |
| 5,842,353 | Kuo-Liang | Jun. 11, 1996 |
| 5,071,060 | DeFelice | Dec. 10, 1991 |
| 4,720,023 | Jeff | Jan. 19, 1988 |
| 4,151,923 | Bernardi | May 1, 1979 |
| 4,141,462 | Rucci | Feb. 27, 1979 |
| D 372,168 | Seager | Jul. 30, 1996 |

Consequently, a need has been felt for providing an apparatus and method which prevent the rapid cooling of a hot beverage and maintains the beverage for consumption at a more constant temperature.

SUMMARY OF THE INVENTION

It is therefore an object of the present invention to provide a constant temperature beverage cup.

It is another object of the present invention to provide an insulated double-wall design to keep beverages warm.

It is yet another object of the present invention to provide a drinking spout to provide drinking access to the cup.

It is yet still another object of the present invention to provide multiple liquid sections wherein an inner section keeps liquid hot and an outer section allows liquid to cool before drinking.

It is still yet another object of the present invention to connect the sections by a pinhole access port.

It is another object of the present invention to keep the beverage at an almost constant temperature ideal for drinking throughout entire cup.

It is yet another object of the present invention to provide a removable cover that allows cup to be filled in conventional manner.

It is yet still another object of the present invention to provide a removable cover that prevents liquid in inner compartment from spilling or leaving cup when it is tipped to drink from.

It is a feature of the present invention to provide the beverage cup with a handle and lid for ease of use.

It is another feature of the present invention to provide a pinhole in cover to release the vacuum in inner compartment to allow liquid to leave through pinhole.

Briefly described according to one embodiment of the present invention, the constant temperature beverage cup, as its name implies, is a cup designed for the holding and drinking of hot beverages. It has an inner and outer section that will help maintain the beverage at an even temperature for drinking from the time the cup is full until it is empty. The cup is in the overall design of a double-walled thermos bottle with a closed cap. There is a small hole between the inner and outer wall in the bottom of the cup. A small amount of hot beverage, such as coffee, will drain into this interstitial space when the invention is set down. The amount that will drain is directly proportional to the amount of beverage in the inner compartment as the liquid will tend to seek its own level. When the user picks up the invention to drink from it, he or she drinks from a spout located on the outer circumference of the cup which allows the liquid in the interstitial space to be drunk. When the invention is set back down, the interstitial space will fill again. In this manner, the mouthful of liquid is allowed to cool away from the rest of the liquid allowing for a hot beverage to be drunk in a more pleasant manner. The use of the constant temperature beverage cup allows one to drink a hot beverage without burning one's mouth, yet while ensuring the beverage will remain hot until the last drop is gone.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 6a is a top view of a lid for a constant temperature beverage cup, according to the preferred embodiment of the present invention;

FIG. 6b is a partial cutaway side view of a lid for a constant temperature beverage cup, according to the preferred embodiment of the present invention;

FIG. 7a is a top view of the beverage vessel for a constant temperature beverage cup, according to the preferred embodiment of the present invention;

FIG. 7b is a side view of a beverage vessel for a constant temperature beverage cup, according to the preferred embodiment of the present invention;

LIST OF REFERENCE NUMBERS

| 10 | Constant Temperature Beverage Cup | 22a | Lip |
|---|---|---|---|
| | | 22b | Ridge |
| 20 | Outer Vessel | 22c | Sidewall |
| 20a | Sidewall | 22d | Bottomwall |
| 20b | Bottomwall | 22e | Inner Volume |
| 20c | Inner Volume | 22f | Vent |
| 20d | Drinking Aperture | 24 | Insulating Chamber |
| 21 | Beverage Vessel | 25 | Beverage Chamber |
| 21a | Lip | 30 | Spout |
| 21c | Sidewall | 40 | Handle |
| 21d | Bottom Wall | 50 | Lid |
| 21e | Conduit | 50a | Channel |
| 21f | Inner Volume | 50b | Vent |
| 22 | Insulating Vessel | 50c | Vent |

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
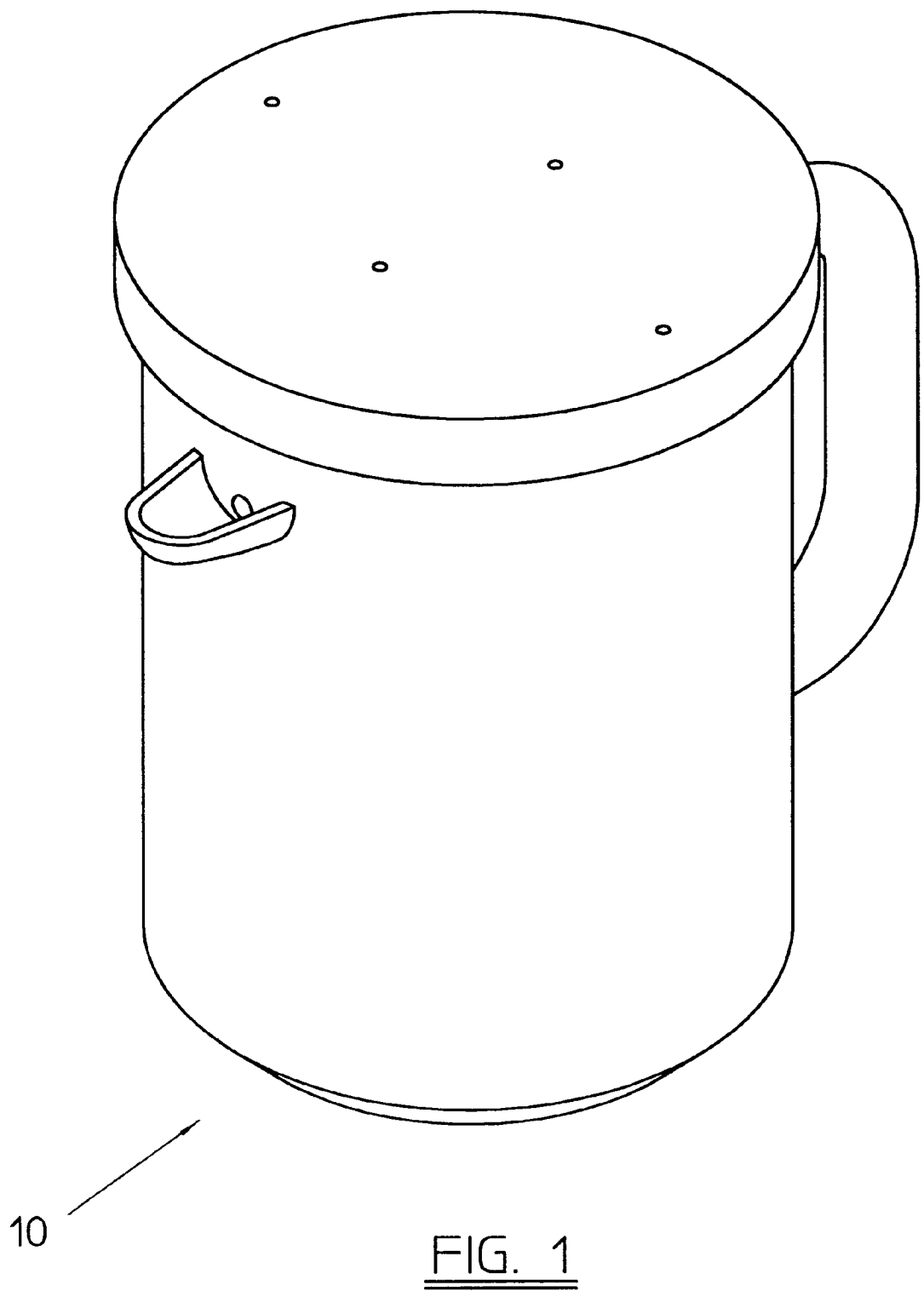
FIG. 1 is a perspective view of a constant temperature beverage cup, according to the preferred embodiment of the present invention.
Figure 2:
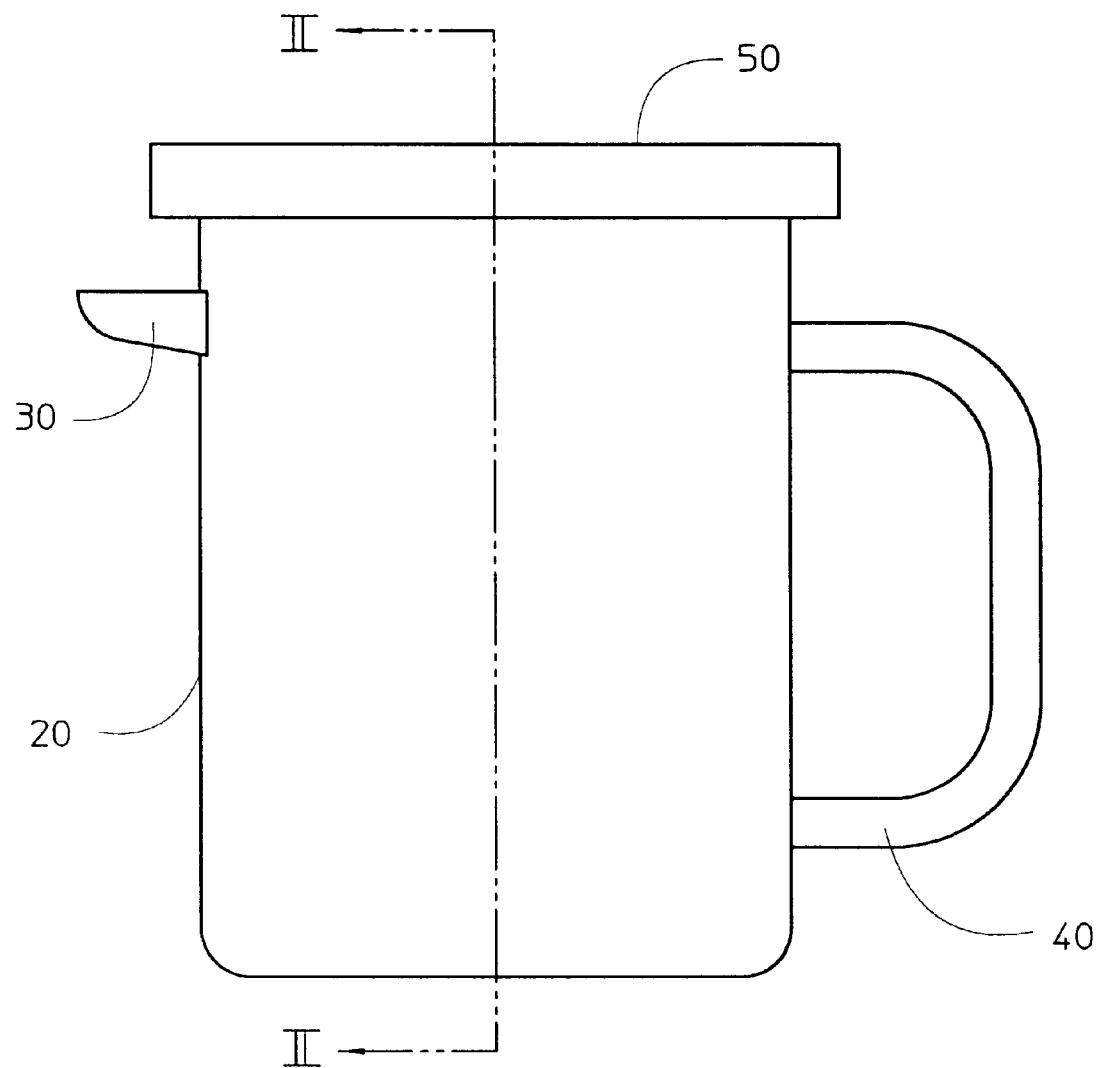
FIG. 2 is a front view of a constant temperature beverage cup, according to the preferred embodiment of the present invention.

Referring now to FIGS. 1 and 2, a constant temperature beverage cup 10 is shown, according to the present invention, for serving hot beverages such as coffee, tea, cocoa and the like. The cup 10 looks like an otherwise conventional coffee cup or mug except that a drinking spout 30 is located on the outer sidewall on one side near the top of the cup 10. The drinking spout enables the beverage to served nearly drip free and directs the hot beverage from a special chamber wherein the beverage is kept at a more near constant temperature. It is envisioned that all parts of the cup 10 would be formed from plastic using conventional injection molding techniques. However, this should not be construed to be limiting as other materials capable of being formed could be used. A handle 40 also protrudes from the outer sidewall of the cup 10. The beverage is kept within the inner volume of the cup 10 by a lid 50 which snaps on the perimeter of the cup 10.

Figure 3:
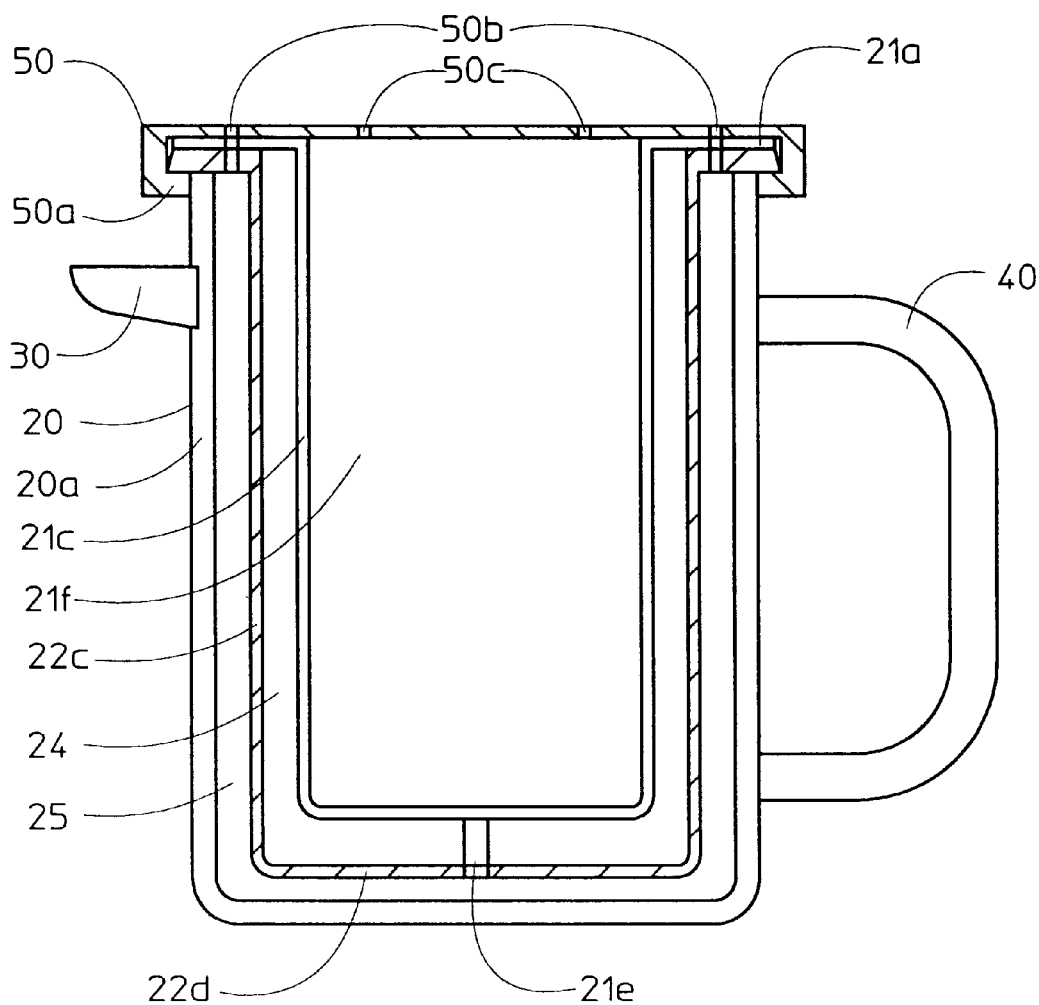
FIG. 3 is a cutaway front view of a constant temperature beverage cup taken along line II—II of FIG. 2, according to the preferred embodiment of the present invention.
Figure 4:
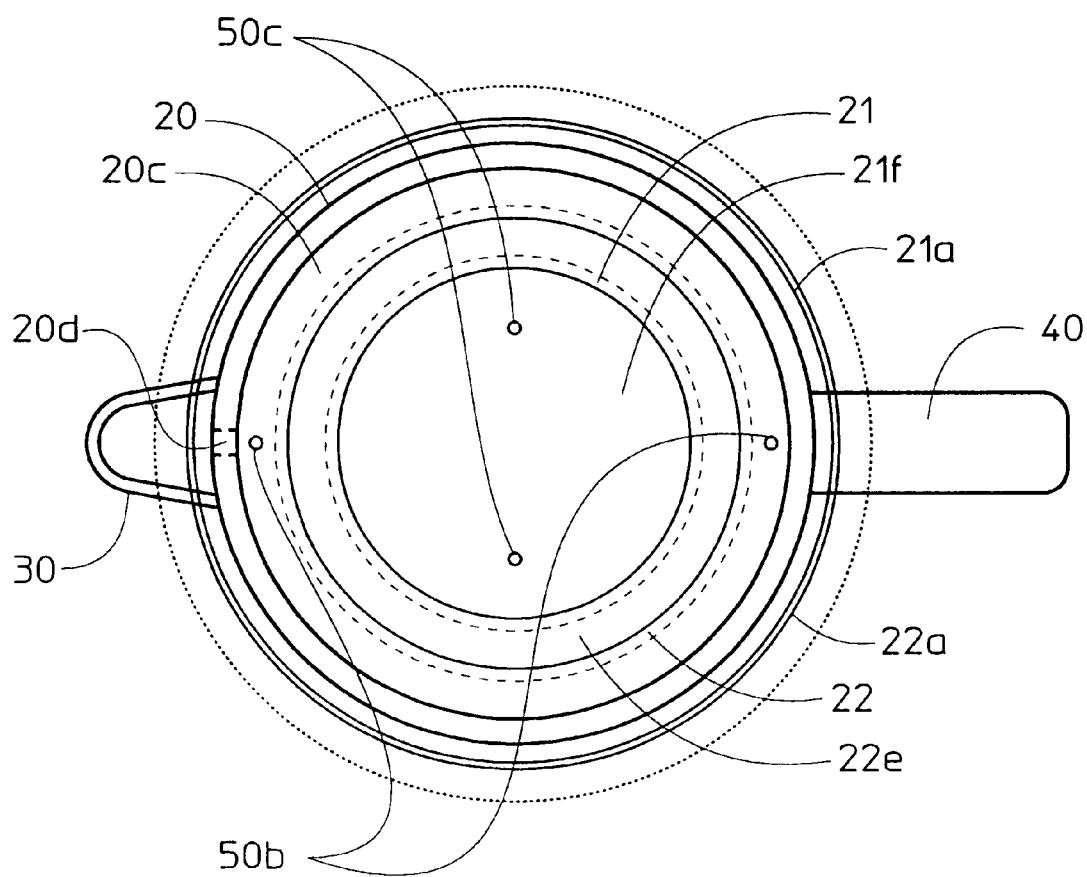
FIG. 4 is a top view of a constant temperature beverage cup, according to the preferred embodiment of the present invention.
Figure 5:
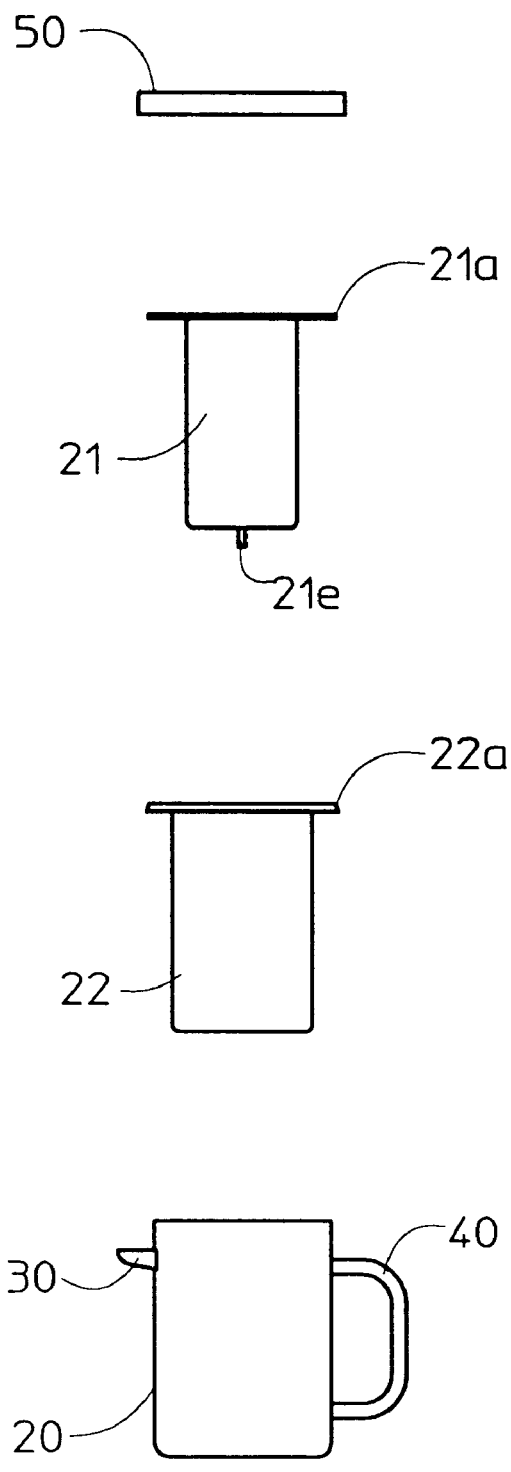
FIG. 5 is a top view of a constant temperature beverage cup, according to the preferred embodiment of the present invention.

Referring now to FIGS. 3 through 5, shown is a constant temperature beverage cup 10, comprised of essentially three vessels of varying diameter wherein the first vessel is disposed within the second, and the second vessel is disposed within the third. Each of the vessels is cylindrical in shape defined by a cylindrical sidewall, a bottomwall, and a mouth wherein access to the inner volume may be had. The first vessel is defined as beverage vessel 21 having a sidewall 21c and an inner volume 21f. The second vessel is defined as insulator vessel 22 having a sidewall 22d and an inner volume 22e. The third vessel is defined as outer vessel 20 having a sidewall 20a, bottomwall 20b, and an inner volume 20c. As described, and referring also to FIGS. 7a and 7b, beverage vessel 21 is of a smaller diameter than insulator vessel 22 so that when beverage vessel 21 is disposed within insulator vessel 22 a chamber 25 is formed between them extending radially around the entire circumference of sidewall 21c beverage vessel 21 and bottomwall 21d. The purpose of chamber 25 will be described herein below. Beverage vessel 21 has a lip 21a on its upper end formed around the circumference of the mouth leading to inner volume 21f. A small aperture formed in the center of bottomwall 21d places inner volume 21f in fluid communication with a conduit 21e extending longitudinally from the lower surface of bottomwall 21d. The purpose of conduit 21e will be described further herein below.

Figure 8A:
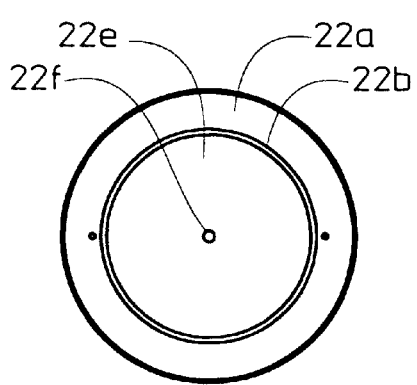
FIG. 8a is a top view of the insulator vessel for a constant temperature beverage cup, according to the preferred embodiment of the present invention.
Figure 8B:
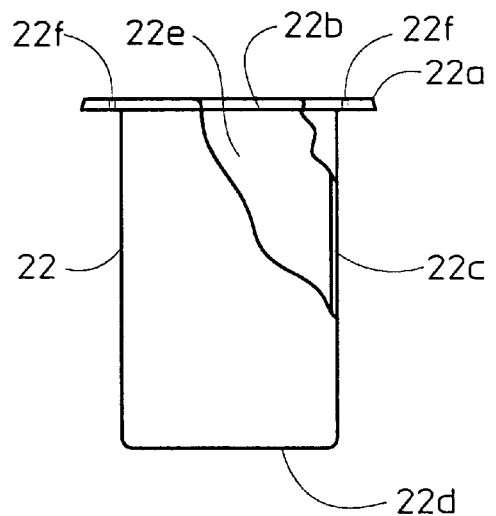
FIG. 8b is a partial cutaway side view of the outer vessel for a constant temperature beverage cup, according to the preferred embodiment of the present invention.
Figure 9A:
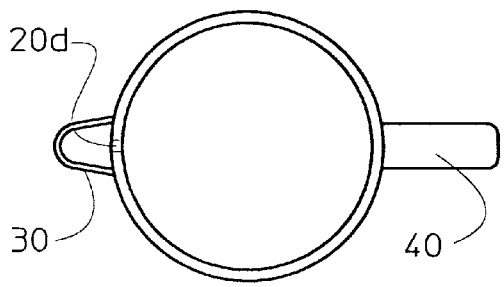
FIG. 9a is a top view of the outer vessel for a constant temperature beverage cup, according to the preferred embodiment of the present invention.
Figure 9B:
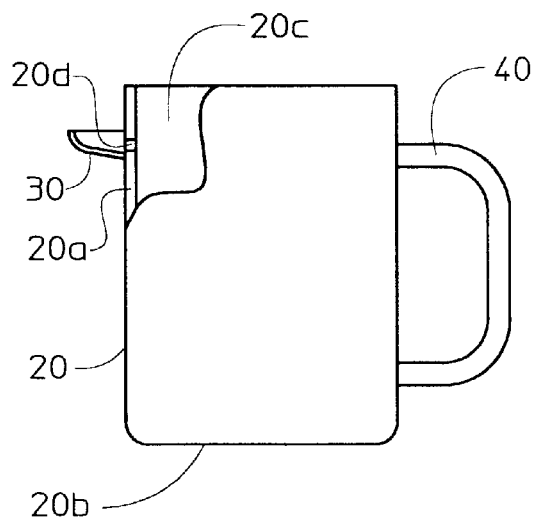
FIG. 9b is a partial cutaway side view of the outer vessel for a constant temperature beverage cup, according to the preferred embodiment of the present invention.

Insulator vessel 22 (referring now also to FIGS. 8a and 8b) is now disposed within inner volume 20c of outer vessel 20, and as described, insulator vessel 22 is of a smaller diameter than outer vessel 20 so that a chamber 24 is defined there between. Chamber 24 extends radially around the circumference of sidewall 22c of insulator vessel 22 and bottomwall 22d. A lip 22a is formed on the upper portion of insulator vessel 22 around the circumference of the mouth of insulator vessel 22 leading to inner volume 22e. The upper surface of the outer periphery of lip 22a is tapered downward to receive lid 50 in a snap-tight frictional arrangement discussed further herein below. Located on the inner periphery of the mouth of insulator vessel 22 is an annular ridge for receiving lip 21a of beverage vessel 21 in a semi-interference type fit. An aperture 22f in the center of bottomwall 22d allows conduit 21e to pass through bottomwall 22d to place inner volume 21f of beverage vessel 21 in fluid communication with chamber 24. Chamber 25 is fluid tight to conduit 21e, inner volume 21f, and chamber 24. The diameter of lip 22a is slightly larger than the diameter of the mouth of outer vessel 20 so that lip 22a rests on the mouth of outer vessel 20 and hence insulator vessel 20 is supported in outer vessel 20. Final assembly would include fusing lip 22e to the mouth of outer vessel 20 with adhesives or other bonding methods. An aperture 20d (best seen in FIG. 9a and 9b) formed in the sidewall 20a of outer vessel 20 in the area of drinking spout 30 places chamber 24 in fluid communication with the atmosphere to allow a user to draw the beverage into their mouth.

Finally, to keep the beverage within inner volume 21f of beverage vessel 21 lid 50 (FIGS. 6a and 6b) is snapped into place over lip 22a of insulator vessel 22. The inner diameter of lid 50 is of a slightly smaller diameter than lip 22a. An annular channel 50a formed in the sidewall of lid 50 will grip the outer periphery of lip 22a when lid 50 is pressed down onto lip 22a. An upward push will cause lip 22a to be pulled from channel 50a and lid 50 is released. At least two vent holes 50b are formed in lid 50 directly above chamber 24 so chamber 24 is in fluid communication with the atmosphere. Likewise, a vent hole 22f is formed in insulating vessel 22 directly beneath each of the aforementioned vent holes 50b to complete the fluid communication from chamber 24 to the atmosphere. At least two more vent holes are formed in lid 50 to place inner volume 21f of beverage vessel 21 with the atmosphere.

2. Operation of the Preferred Embodiment

To use the present invention, the lid is removed from the cup with a slightly upward push, exposing an inner volume wherein a hot beverage may be poured. The lid is returned to the cup with a firm push. A special lip around the mouth of the cup cooperates with an annular groove in the lid to keep the lid tightly in place. Beverage is gravity drained from the inner volume to an outer chamber located near the outer sidewall of the cup via a conduit in the bottom of the inner volume. The conduit passes through another inner chamber containing only air. The air in the inner chamber acts as an insulator to the beverage in the inner volume keeping it hot. Beverage is free to flow from within the inner volume to the outer chamber as the beverage is sipped from an aperture in the sidewall of the outer chamber and the cup. The beverage will flow until liquid levels in the inner chamber and the outer chamber are equal. A drinking spout is provided to assist in this function. A vent is provided in the top of the outer chamber and the inner volume to prevent a buildup of a vacuum in either places that may prevent free fluid communication between them. Allowing the beverage to flow between the inner volume where it is primarily stored and to the outer chamber where it waiting to be consumed serves several purposes. First, beverages in the inner volume are insulated from the atmosphere by the inner chamber filled with air which would otherwise cool the beverage. Second, the beverage in the outer chamber would tend to cool more quickly because of the closer proximity to the atmosphere, lack of an insulator, and the greater surface area of the outer sidewall of the outer chamber or cup. This is desired to enable the user to more quickly begin to consume the beverage than if it were to be consumed from an insulated inner volume. Third, as the beverage in the outer chamber cools, it cools more slowly because the beverage in the inner chamber is also cooling giving off heat which must now flow through the insulator, albeit slowly, which the beverage in the outer chamber must absorb. The net effect is that the beverage in the outer chamber will cool more slowly and the temperature in the inner volume and outer chamber will tend to be more constant.

The foregoing description is included to illustrate the operation of the preferred embodiment and is not meant to limit the scope of the invention. The scope of the invention is to be limited only by the following claims.

What is clamed is:

1. A beverage cup for decreasing the thermal flux of the contents, said beverage cup comprising:

a first vessel being a beverage vessel having a sidewall and an inner volume;

a second vessel being an insulator vessel having a sidewall and an inner volume;

a third vessel being an outer vessel having a sidewall, bottomwall, and an inner volume, and wherein said first vessel, said second vessel and said third vessels are each of varying diameter wherein said first vessel is disposed within a second, and said second vessel is disposed within a third vessel, each of said vessels having a cylindrical shape defined by a cylindrical sidewall, a bottomwall, and said third vessel forming an inner volume; and a mouth, said mouth protruding from the cylindrical sidewall of said first vessel but being in fluid communication with said inner volume.

2. The beverage cup of claim 1, wherein said beverage vessel is of a smaller diameter than said insulator vessel so that when said beverage vessel is disposed within said insulator vessel a chamber is formed between them extending radially around the entire circumference of sidewall of said beverage vessel and bottomwall.

3. The beverage cup of claim 2, wherein said beverage vessel has a lip on its upper end formed around the circumference of the mouth leading to inner volume.

4. The beverage cup of claim 3, further comprising a small aperture formed in the center of said bottomwall, thereby created fluid communication between said inner volume and a conduit extending longitudinally from the lower surface of bottomwall.

5. The beverage cup of claim 1, wherein said insulator vessel is disposed within said inner volume of said outer vessel and said insulator vessel is of a smaller diameter than outer vessel so that a chamber is defined there between, said chamber extending radially around the circumference of sidewall of insulator vessel and bottomwall.

6. The beverage cup of claim 5, wherein a lip is formed on the upper portion of insulator vessel around the circumference of the mouth of insulator vessel leading to said inner volume, and wherein further an upper surface of the outer periphery of said lip is tapered downward to receive a lid in a snap-tight frictional arrangement.

7. The beverage cup of claim 6, wherein located on the inner periphery of the mouth of insulator vessel is an annular ridge for receiving lip of beverage vessel in a semi-interference type fit.

* * * * *